Jan. 5, 1937.　　　W. D. APPEL ET AL　　　2,066,310
DISPLAY APPARATUS
Original Filed June 2, 1934　　4 Sheets-Sheet 1

Jan. 5, 1937.  W. D. APPEL ET AL  2,066,310
DISPLAY APPARATUS
Original Filed June 2, 1934   4 Sheets-Sheet 2

Inventors
William D. Appel.
Herbert F. Schiefer.
By
Stone, Boyden & Mack
Attorneys.

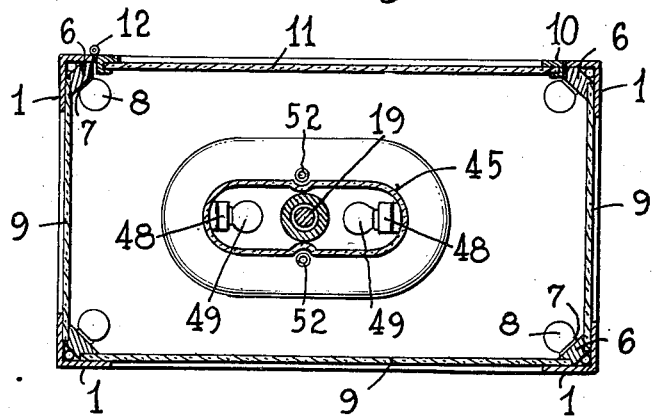
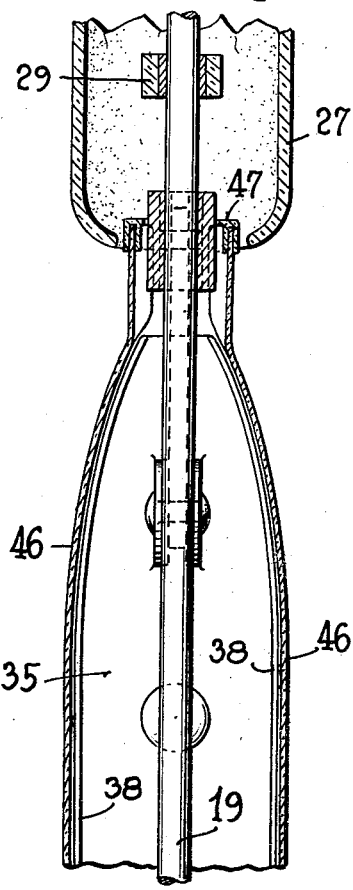
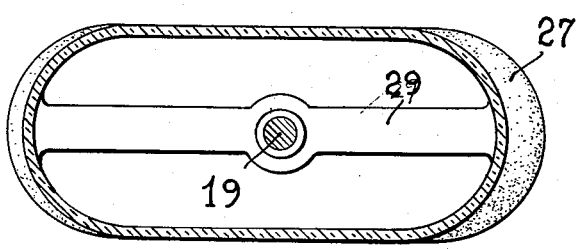
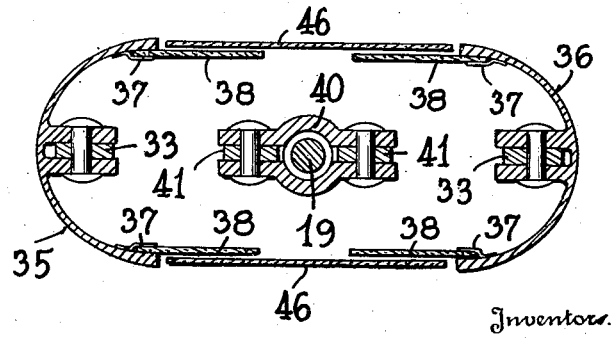

Jan. 5, 1937.  W. D. APPEL ET AL  2,066,310
DISPLAY APPARATUS
Original Filed June 2, 1934   4 Sheets-Sheet 4

Inventors
William D. Appel.
Herbert F. Schiefer.
By Stone, Boyden & Mack
Attorneys Patented Jan. 5, 1937

2,066,310

UNITED STATES PATENT OFFICE 2,066,310

DISPLAY APPARATUS

William D. Appel and Herbert F. Schiefer, Washington, D. C.

Application June 2, 1934, Serial No. 728,776
Renewed October 21, 1936

21 Claims. (Cl. 35—56)

This invention relates to display apparatus. More particularly, it relates to apparatus for displaying tubular stretchable articles, as for example those of woven or knitted fabric such as stockings to demonstrate visually their resistance to flexing and stretching.

It is an object of this invention to provide apparatus for mounting a stocking on a form therefor and subjecting it to a series of recurrent stretchings and stresses.

A further object of the invention contemplates the provision of a plurality of members adapted to extend within a stocking to be displayed and of automatic means for causing relative movement of these members to stretch the stocking.

Yet another object of the invention is to provide means for displaying a stocking while the stocking is subjected to substantially the same stresses which would be imposed on it in everyday wear.

Still further the invention contemplates the provision of means whereby the stocking may be supported on translucent members and illuminated internally to give a clearer and more effective display.

A still further object of the invention consists in the provision of external as well as internal illuminating means and of means for periodically lighting and extinguishing said illuminating means.

Although the specific embodiments described herein and illustrated in the accompanying drawings are merely illustrative of several specific forms of the invention, it will be apparent that the invention is susceptible of many further and various modifications limited only by the scope of the appended claims.

Figure 2:
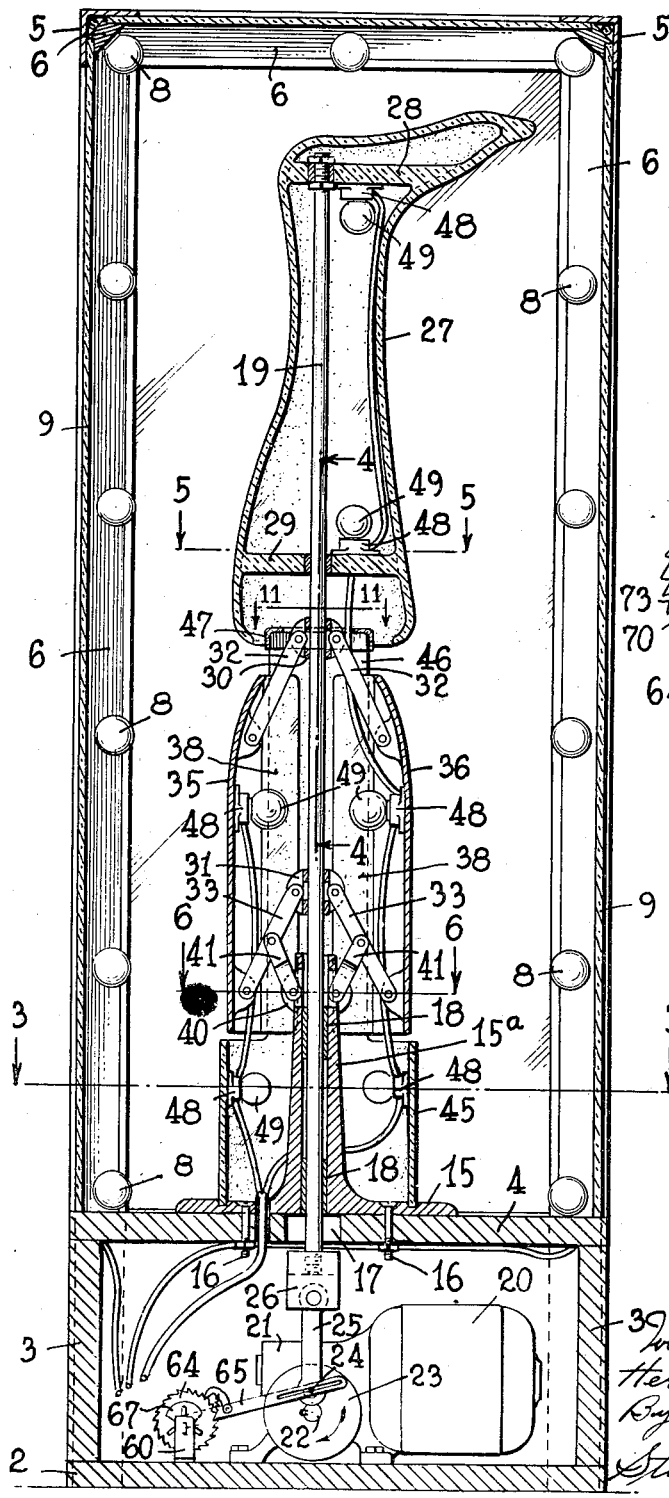
Fig. 2 is a vertical sectional view of the apparatus showing the operating mechanism.
Figure 7:
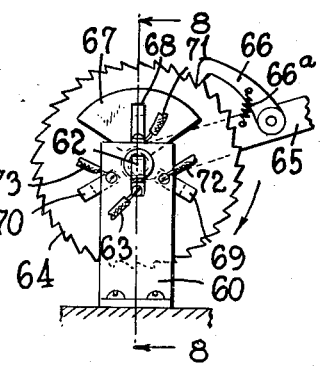
Figure 8:
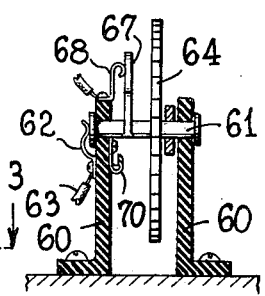
Figure 9:
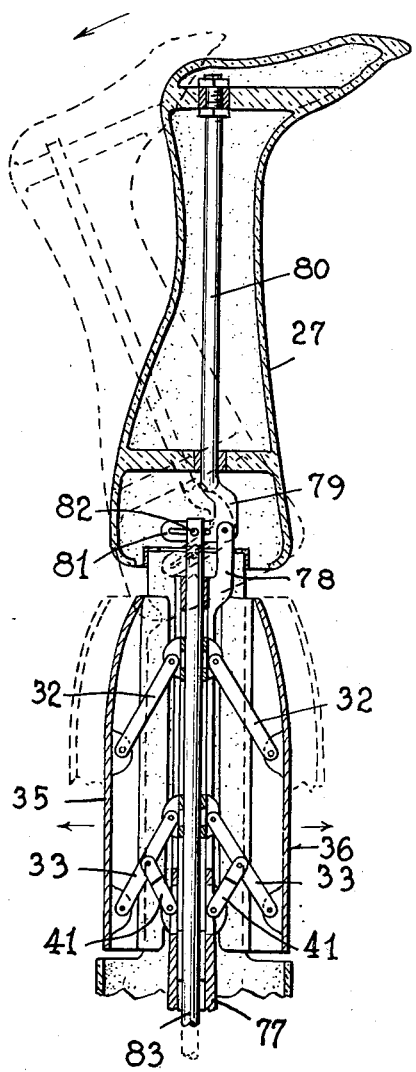
Figure 10:
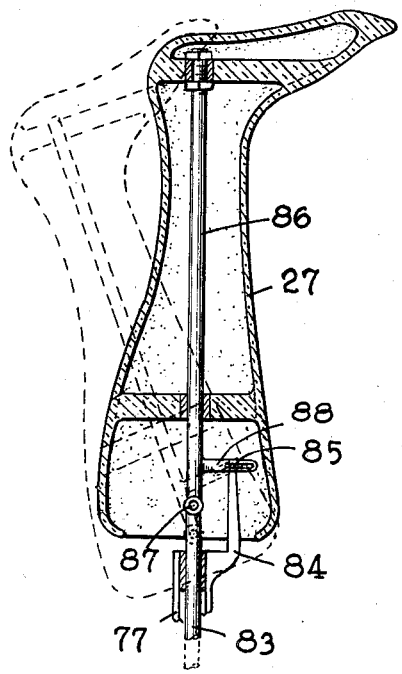
Figure 11:
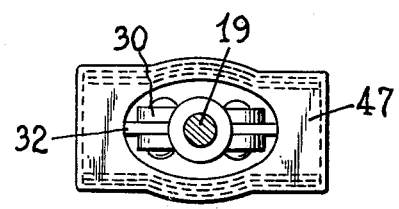

Figs. 3, 4, 5, and 6 are sectional views taken on the lines 3—3, 4—4, 5—5, and 6—6 respectively of Fig. 2, in each instance looking in the direction of the arrows;

Fig. 7 is an enlarged side elevation showing the means for controlling the lighting circuits;

Fig. 8 is a sectional view taken on the line 8—8 of Fig. 7;

Fig. 9 is a vertical sectional view of a modified form of the apparatus adapted to move the foot and lower leg from the knee;

Fig. 10 is a vertical section of a still further modified form of the apparatus to simulate a foot and lower leg movement such as that provided by the apparatus of Fig. 9; and Fig. 11 is a horizontal sectional view taken on the line 11 of Fig. 2 looking in the direction of the arrows.

With more particular reference to the drawings, the specific embodiment of the invention illustrated therein comprises a main frame composed of four corner posts 1 extending vertically upward from a base 2. The corner posts 1 may be constructed from any suitable material and are illustrated as being formed from lengths of steel right-angle angle sections.

The lower portion of the frame work is enclosed by means of wall panels 3 and a floor 4 of wood or other suitable material preferably not transparent. The panels 3 and 4 form together with the base 2 an enclosed housing for the operating and circuit control mechanism of the display apparatus. One of the wall panels 3 may be removably mounted to provide a means of access to the housing to adjust or repair the mechanism housed therein.

The upper extremities of the corner posts are joined by means of angle sections 5 similar in cross section to the angle sections forming the corner posts 1. In each of the members 1 and 5, above the floor 4 is mounted a filler strip 6. These filler strips are disposed at a 45° angle to the surfaces of the angle members and are provided at suitable intervals with sockets 7 adapted to receive electric light bulbs 8 to illuminate the display apparatus. It will be seen that the filler strips 6 together with the angle pieces form passageways, triangular in cross-section, which serve to house the circuit wires connecting the sockets 7. The filler strips 6 are rabbeted adjacent their edges in order to form a groove for the reception of glass panels 9 which form transparent walls for the frame work on three sides and top. On the fourth side of the frame work the construction of the angle pieces and filler strips is somewhat modified to permit mounting of a door frame 10, seen in Fig. 3. The door contains a glass panel 11 of substantially the same size as the panel on the opposite side of the frame work and when closed gives substantially the same appearance. This door frame 10 is pivotally secured by means of hinges 12 to one of the adjacent corner posts 1 and provides a convenient means of access to the interior of the frame work above the floor 4.

Mounted within the frame work on the floor 4 is a casting 15 having a flanged base secured to the floor 4 by means of suitable bolts 16. The casting has a hollow cylindrical upstanding portion 15ª substantially centrally disposed within the casing and mounted over a hole 17 in the floor 4. Disposed within the portion 15ª of the casing are a pair of coaxial, spaced bushings 18 which serve to guide a vertically disposed operating rod 19.

Beneath the floor 4 on the base 2 is mounted an electric motor 20 directly connected to a worm reduction gear 21 which drives a horizontally disposed shaft 22 at reduced speed. A substantially circular plate 23 is keyed to the shaft 22 and has an axially projecting crank pin 24 mounted in its face. The motor 20, gear 21 and plate 23 are so disposed within the housing that the crank pin will be directly beneath the hole 17 in the floor 4. A suitable connecting rod 25 has one end pivotally mounted in a block 26 secured to the lower end of the operating rod 19 and has its other end journalled on the crank pin 24.

It will now be seen that as the electric motor 20 is run, a vertical reciprocatory movement will be imparted to the rod 19. This movement will be relatively slow due to the reduction gear 21, and the length thereof will be determined by the radial distance of the crank pin 24 from the axis of the shaft 22.

The operating rod 19 extends nearly to the upper end of the frame work and has mounted thereon a foot member 27 adapted to partially support the stocking to be tested. The foot member is preferably formed of glass, porcelain or some other suitable material which is to some extent translucent but not transparent and having an external conformation such that an ordinary woman's stocking will smoothly fit thereon. Internally the foot portion 27 is provided with a pair of struts 28 and 29 which have holes therethrough and serve to provide means by which the foot portion may be rigidly and permanently secured to the operating rod 19.

Rigidly secured to the operating rod 19 on the portion thereof below the foot member 27 are a pair of spaced clamps 30 and 31 each having pivotally secured thereto two toggle links 32 and 33 respectively. These toggle links are mounted on diametrically opposed sides of their respective clamps and all lie in substantially the same plane. The outer ends of the links on one side are pivotally secured to a channel shaped member 35 having a smoothly rounded outer surface which forms a substantial continuation of the adjacent surface of the foot member 27. The toggles 32 and 33 on the opposite side of the operating rod are connected in a similar manner to a member 36 similar in construction to the member 35.

The members 35 and 36 may be made of metal and are provided at their inner edges with clamping strips 37 which serve to retain relatively narrow panels 38 of translucent material similar in nature to the material of which the foot member 27 is formed. The panels 38 on the front of the apparatus lie in the same plane and those on the rear side lie in a plane parallel thereto.

A pair of lugs 40 are formed on opposite sides of the portion 15ª of the casting and serve to mount pivotally the inner ends of a pair of short toggle links 41. The outer ends of these links 41 are each pivotally connected to the toggle links 33 at a point about midway between the ends thereof.

From the foregoing it will be clear that as the vertical operating rod 19 is reciprocated it will slide freely through the bushings 18, but due to the rigid securement of the clamps 30 and 31 to the rod, these will be reciprocated vertically. Due to the connections of the toggle links 41 to the links 33 it will be apparent that vertical reciprocation of the rod 19 will cause the members 35 and 36 to be reciprocated transversely toward and away from the operating rod with little or no vertical movement and at all times remaining substantially parallel to each other. Due to the rigid connection of the foot member 27 to the rod 19 it will be seen that as the rod is reciprocated the foot member will likewise be reciprocated vertically as indicated by the dotted lines in Fig. 1, and it will be seen that downward movement of the rod causes a relative expansion of the members 35 and 36 permitting the lower portion of the foot member to enter between them.

In order to conceal the operating mechanism a housing member 45 is provided having an oval base portion mounted on the casting 15 and adapted partially to surround the upstanding portion 15ª thereof. This base portion, although stationary, roughly forms a continuation of the outer surfaces of the members 35 and 36 and has an upwardly extending stirrup portion 46 comprising panels on each side of the rod forming substantial continuations of the external surfaces of the members 35 and 36 and so positioned that the panels 38 may slide behind them as the members 35 and 36 are reciprocated. This is clearly shown in Fig. 6. These panels are flat in the lower portion and slightly curved above as shown in Fig. 4.

These side panels 46 extend upwardly within the foot member 27 and are joined by a cross piece 47 which strengthens them and surrounds the operating rod 19. This cross piece 47 has an aperture sufficiently large to permit the operating rod 19 and clamp 30 to pass therethrough as is seen in Fig. 11. The width of the panels 38 is sufficient so that as the members 35 and 36 reciprocate a portion of these panels will always remain behind the panels 46 thus at all times maintaining the interior mechanism obscured from view.

A plurality of electric sockets 48 are mounted interiorly of the apparatus as is seen in Fig. 2. These sockets are mounted on the struts 28 and 29 in the foot member 27, on the internal surfaces of the members 35 and 36 and on the internal surface of the housing member 45 and are connected by suitable flexible circuit wires in order to permit the necessary relative movements of the various parts. A small electric light bulb 49 is provided for each of the sockets and inasmuch as all of the sockets are connected to the same circuit it will be apparent that all of the bulbs may be simultaneously lighted.

Figure 1:
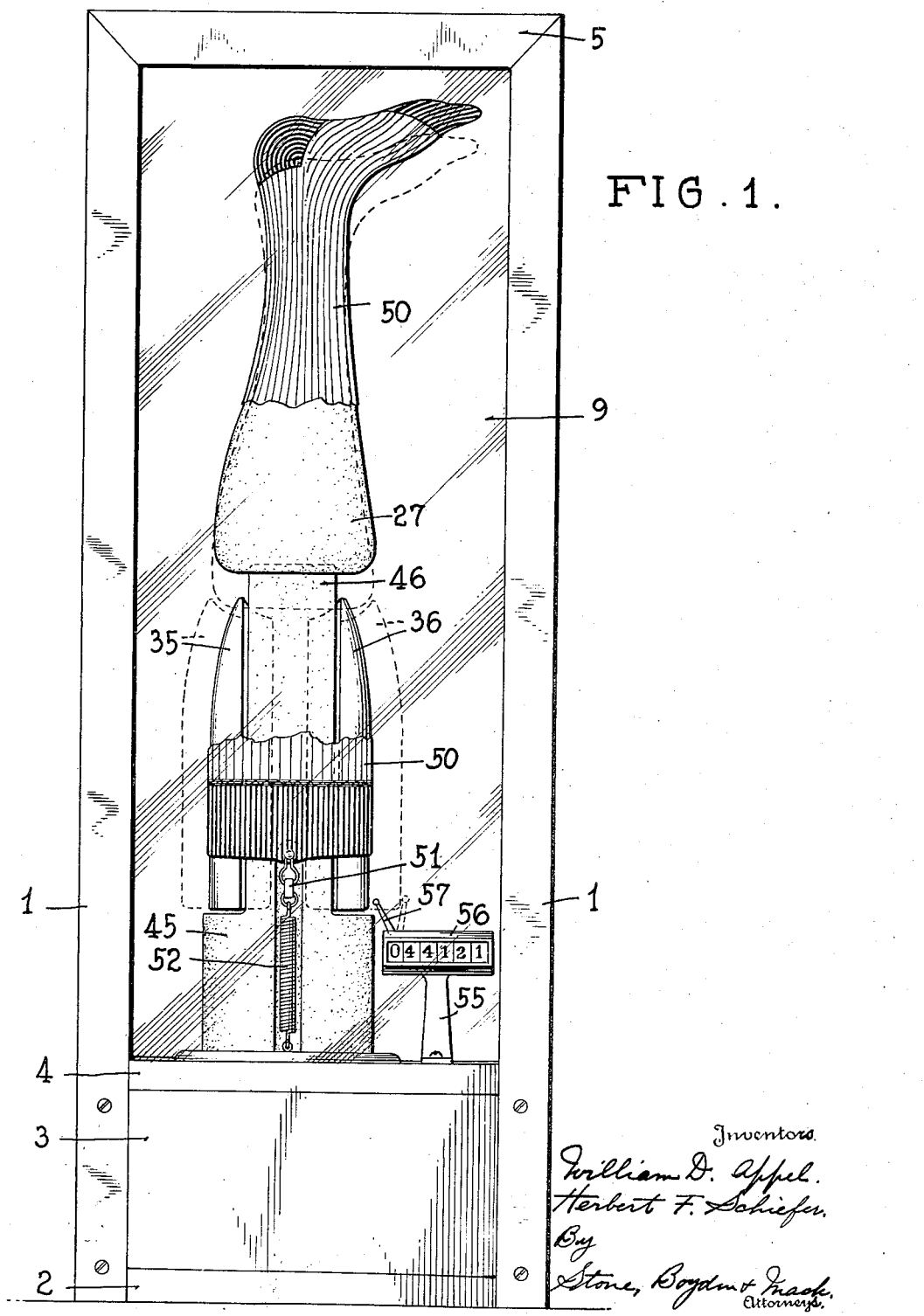
Fig. 1 is a front elevation of the improved display apparatus.

As is seen in Fig. 1 a stocking 50 may be pulled on over the member 27 and down over the members 35 and 36, the parts being of such proportions that the circumferential length as well as the axial length correspond very nearly to the measurements of the leg of the average wearer, when the members 35 and 36 are in the position shown in Figs. 1 and 2.

The welt edge of the stocking top may be secured in position by means of a pair of garter clasps 51 resiliently secured to the base of the casting 15 by means of springs 52 or other suitable elastic means.

It will be clear that in the apparatus described above, the reciprocation of the various members internally of the stocking serves to subject it to stresses similar to those encountered during daily use. It is well recognized that due to the nature of the fabric of which most stockings are composed the circumferential lengthening of a portion of the leg portion causes a shortening of the length. To permit this it is clearly seen that the foot member 27 moves down as the members 35 and 36 are moved away from each other.

An odometer 56 may be mounted on a suitable pedestal 55 in such a position that the trip lever 57 thereof will contact the member 36 during its movement so that the odometer will graphically indicate the number of cycles of operation to which a particular stocking has been subjected.

Although the various lights described above may be connected directly to a source of current and remain constantly lighted during the operation of the apparatus, there are provided means for periodically lighting and extinguishing these lights during the operation of the apparatus to render the display, generally, more pleasing and effective. To this end there is provided a switch located in the housing beneath the floor 4. This switch comprises a pair of insulating posts 60 mounted on the base 2 and having journalled therein a metallic shaft 61. The shaft has a brush 62 for maintaining contact therewith during rotation mounted on one of the posts 60, abutting against one end of the shaft to which brush is connected the common return circuit wire 63. Integral with and rigidly secured to the shaft is a ratchet wheel 64. An actuating lever 65 has one end journalled on the shaft 61 and the other slotted to receive the crank pin 24 on the plate 23. The lever 65 has a pawl 66 pivoted thereto adapted to engage the toothed periphery of the ratchet wheel 64 and held in position by a spring 66ª. Thus it will be seen that as the motor is run, the shaft 61 will be rotated step by step. A metallic sector 67 is also secured to the shaft adapted to slide past and electrically contact three stationary brushes 68, 69 and 70. A circuit wire 71 connects with the brush 68 and leads to alternate sockets in the frame work which contain bulbs of a distinctive color. A circuit wire 72 connects with the brush 69 and leads to the remaining sockets in the frame work which contains bulbs of a different distinctive color. The remaining circuit wire 73 leading from the brush 70 controls the circuit to the sockets 48 located internally of the members 27, 35, 36 and 45 which serve to illuminate the stocking being displayed from the interior thereof.

It will be clear from the foregoing that the running of the motor will cause a step by step advance of the sector 67 successively closing the three light circuits and serving periodically to light and extinguish the various sets of lights. It will be noted that the sector 67 extends over some considerable angular distance and hence that frequently two of the three circuits will be closed at the same time. It is apparent, therefore, that the stocking being displayed will not only be constantly stretched in substantially the same manner as when it is worn but will be subjected to periodically changing illumination. The fact that some of the members located within the stocking being displayed are translucent contributes to a novel and extremely attractive lighting effect. This coupled with movement of the stocking renders the display as a whole very effective.

A modified form of the invention is illustrated in Fig. 9. A casting 77 is substituted for the casting 15 shown and described in connection with the preceding figures. The cylindrical central portion of this casting is carried up considerably further than is the case with the portion 15ª of the casting 15. This extending central portion of the casting 77 is slotted to permit the mounting of the various clamps and toggle links which are substantially the same as have been described in connection with the preceding figures and are designated by like reference characters.

The upper end of the central portion of the casting 77 is provided at one side thereof with an upstanding ear 78 on which is mounted a bell crank arm 79 pivotally connected thereto. The bell crank arm has a long upstanding portion 80 which serves to mount the foot member 27. A transversely extending portion 81 of the bell crank arm is slotted to receive a pin 82 carried by the upper end of a vertical operating rod 83, which is substantially the same as the operating rod 19, up to the point where the pin 82 is inserted. The rod 83 terminates shortly above this point and is not used to support the foot member of the apparatus as was the rod 19.

It will be apparent that the vertical reciprocation of the rod 83 will cause, due to the bell crank arm, a short reciprocating arcuate movement of the foot member 27 about its pivot. This construction, when operated as in the case of the previous construction, will cause a flexing of the stocking being displayed at the knee portion and result in stresses being imposed upon the fabric substantially the same as those imposed during walking when the stocking is worn.

A modified form of the device illustrated in Fig. 9 is shown in Fig. 10, wherein the uppermost end of the casting 77 is provided with an upstanding lug 84 having a laterally extending pin 85 carried in its upper end. A rod 86 serving to support the foot member 27 is pivoted by means of a pin 87 directly to the end of the vertical operating rod 83. The rod 86 has a lateral extending portion 88, which is slotted to receive the laterally extending pin 85 of the lug 84.

It will be apparent from this construction that as the operating rod 83 is reciprocated vertically, the foot member 27 will not only be reciprocated vertically, but will be pivotally moved about the pin 87 through a limited arcuate reciprocation. It is apparent that in both of these modifications, the connecting cross piece 47 will have to be sufficiently modified to permit the various parts to extend therethrough.

It is further clear that in each instance, these modified forms of the invention may contain similar means for illuminating them interiorly and be mounted and displayed in substantially the same manner as the form of the invention disclosed in the preceding figures.

It is thought that it will be perfectly clear from the foregoing that the embodiments of the invention herein illustrated and described are merely illustrative of optional forms in which the invention may be practiced.

It will be clear that the apparatus herein disclosed for example may be inverted by a simple reversal of parts, in order that the stocking may be mounted with the foot downwardly disposed and more nearly simulate the position in which it is actually worn. Many and further modifications will become apparent to those skilled in the art.

We claim:
1. Apparatus for displaying hosiery comprising members adapted to extend within and to support the article being displayed, means for pe- riodically elongating said article, and means for alternately stretching circumferentially of a portion of said article.

2. Apparatus for displaying hosiery comprising members adapted to extend within a stocking to be displayed, one of said members adapted to support the foot portion of said stocking and other members adapted to support the leg portion of said stocking, and a motor for causing relative movement of all of said members to stretch said stocking alternately longitudinally and circumferentially.

3. Apparatus for displaying hosiery comprising a foot member adapted to extend within the article to be displayed, relatively movable members adapted to be moved toward and from each other and supporting the leg portion of the hosiery and also movable with respect to said foot portion, and means for imparting a repeated reciprocatory movement to one of said members to vary alternately the axial and circumferential length of the article being displayed.

4. Apparatus for displaying hosiery comprising a foot member adapted to extend within a stocking to be displayed to support the foot portion thereof, relatively movable members adapted to be moved toward and from each other and supporting the leg portion of the hosiery and also movable with respect to said foot portion, and driving means operatively associated with said members to cause repeated relative movement thereof.

5. Apparatus for displaying hosiery comprising a pair of substantially parallel members adapted to extend within a stocking to be displayed, driving means operatively associated with said members to reciprocate them relatively to cause variations in the circumferential length of a portion of said stocking, and means for supporting the foot portion of said stocking during movement of said members.

6. Apparatus for displaying hosiery comprising a pair of substantially parallel members adapted to extend within a stocking to be displayed, and driving means operatively associated with said members to cause repeated relative movement of said members while in substantially parallel relation.

7. Apparatus for displaying hosiery comprising a foot member adapted to extend within a stocking to be displayed to support the foot portion thereof, relatively movable members adapted to be moved toward and from each other and supporting the leg portion of the hosiery and also movable with respect to said foot portion, and driving means operatively associated with said leg members to reciprocate them relatively to vary the circumferential length of the leg portion of the stocking.

8. Apparatus for displaying hosiery comprising a pair of members adapted to extend within a stocking to be displayed, driving means associated with said members to repeatedly move them relatively to cause a variation in the circumferential length of said stocking, means for supporting the foot portion of the stocking, and means causing longitudinal reciprocation of said foot supporting means in accordance with the said variation in circumferential length.

9. Apparatus for displaying hosiery comprising reciprocable members adapted to extend within a stocking to be displayed, means for periodically reciprocating said members to stretch said article, lights disposed within said stocking for illuminating it internally, and means, associated with said means for reciprocating said members, for periodically lighting and extinguishing said lights.

10. Apparatus for displaying hosiery comprising translucent members adapted to extend within the article being displayed to support the same, said members being relatively movable to stretch the stocking, and means for illuminating said stocking internally thereof.

11. Apparatus for displaying hosiery comprising a translucent foot member adapted to extend within the article to be displayed, translucent members also adapted to extend within the article to be displayed and to support the leg portion thereof, means for causing relative movement of said members, and illuminating means disposed internally of said members.

12. Apparatus for displaying hosiery comprising reciprocable members adapted to extend within a stocking to be displayed, means for reciprocating said members to stretch said stocking, lights disposed within said stocking, and means for periodically lighting and extinguishing said lights.

13. Apparatus for displaying hosiery comprising members adapted to extend within the stocking to be displayed, means for moving said members to stretch the stocking, and means for illuminating said stocking internally.

14. Apparatus for displaying hosiery comprising reciprocable members adapted to extend within a stocking to be displayed, means for automatically reciprocating said members, and means for illuminating said stocking internally during said reciprocatory movement.

15. Apparatus for displaying hosiery comprising a pivotally mounted foot member adapted to extend within a stocking to be displayed, members also adapted to extend within said stocking to support the leg portion of said stocking, means for causing relative movement of said foot member with respect to said members about its pivot and means for moving said last mentioned members relative to each other to repeatedly stretch the leg portion.

16. Apparatus for displaying hosiery comprising members adapted to extend within a stocking to be displayed, two of said members being relatively movable to cause a variation in the circumferential length of the stocking, one of said two members being adapted to receive the front of the stocking and having a substantially continuous curved surface at that portion on which the immediate front of the stocking rests, the other of said two members constituting the rear element and having a corresponding uninterrupted and continuous curved surface adapted to receive the intermediate rear central portion of the stocking, said stocking supporting members including an element for supporting the foot of the stocking and which element is separate from said two members which support the front and rear portion of the stocking, and driving means for causing relative movement of said members.

17. Apparatus for displaying hosiery comprising members adapted to extend within a stocking to be displayed, a shaft extending lengthwise of and between those of said members adapted to support the leg portion, arms pivotally connected to said shaft and pivotally connected to said leg portion members, each of said arms having connected thereto and serving as a fulcrum therefor a link constituting a lever extending to a fixed support, whereby when there is relative movement between said shaft and said fixed support the arms and the leg supporting portions are moved with respect to said shaft to stretch the stocking circumferentially, and driving means associated with said members for causing relative movement thereof.

18. Apparatus for displaying hosiery comprising leg portion supporting members adapted to extend within a stocking to be displayed, a shaft extending lengthwise and between said members adapted to support the leg portion, arms pivotally connected to said shaft and pivotally connected to said leg portion members, each of said arms having connected thereto a link constituting a lever extending to a fixed support whereby, when there is relative movement between said shaft and said fixed support, said arms and said leg supporting portions are moved with respect to said shaft to stretch the stocking circumferentially, and driving means associated with said members for causing relative movement thereof to stretch hosiery exhibited thereon.

19. Apparatus for displaying hosiery, comprising members adapted to extend within and support the article being displayed including the lower leg portion and the upper leg portion, and means for stretching a portion of said article along one side thereof by inclining the lower leg portion with respect to the upper leg portion of the article thus simulating the flexing of the human leg at the knee.

20. Apparatus for displaying hosiery comprising a foot member adapted to extend within the article to be displayed, a plurality of relatively movable members adapted to be moved toward and from each other and supporting both the lower and the upper leg portion of the hosiery, and means for imparting a repeated reciprocatory movement to said members whereby the lower leg portion supporting member is moved with respect to said upper leg portion supporting members and the latter are moved with respect to each other to repeatedly stretch the leg portion of the article being displayed.

21. Apparatus for displaying hosiery comprising a foot member adapted to extend within a stocking to be displayed to support the foot portion thereof, relatively movable members adapted to be moved toward and from each other and supporting the upper leg portion of the hosiery, a first connecting means between the foot supporting member and the leg portion supporting members, second connecting means between said relatively movable members, and driving means operatively associated with both said first and said second connecting means whereby the foot supporting member is moved with respect to said leg portion supporting members and the latter are moved with respect to each other to repeatedly stretch the leg portion circumferentially and lengthwise.

WILLIAM D. APPEL.
HERBERT F. SCHIEFER.